US 8,143,847 B2

(12) United States Patent
Kim (10) Patent No.: US 8,143,847 B2
(45) Date of Patent: Mar. 27, 2012

(54) BATTERY PACK AND MANUFACTURING METHOD THEREOF (75) Inventor: Heongsin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 598 days.

(21) Appl. No.: 11/760,300

(22) Filed: Jun. 8, 2007

(65) Prior Publication Data

US 2008/0054849 A1 Mar. 6, 2008

(30) Foreign Application Priority Data

Aug. 31, 2006 (KR) .................. 10-2006-0083667

(51) Int. Cl.
H02J 7/00 (2006.01)
H01M 2/00 (2006.01)
H01M 2/08 (2006.01)
H01M 2/04 (2006.01)
H01M 2/02 (2006.01)

(52) U.S. Cl. ........ 320/112; 429/163; 429/175; 429/176; 429/177

(58) Field of Classification Search .................. 320/107, 320/112, 113; 429/163, 175, 176, 177
See application file for complete search history.

(56) References Cited

U.S. PATENT DOCUMENTS

| 6,265,104 | B1 | 7/2001 | Hull et al. | |
| 6,881,371 | B2 * | 4/2005 | Iwaizono et al. | 264/261 |
| 2003/0008208 | A1 | 1/2003 | Yamazaki | |
| 2003/0180582 | A1 * | 9/2003 | Masumoto et al. | 429/7 |
| 2005/0221175 | A1 | 10/2005 | Yoon | |
| 2005/0287400 | A1 | 12/2005 | Cho | |
| 2006/0127756 | A1 * | 6/2006 | Seo | 429/175 |
| 2006/0199075 | A1 * | 9/2006 | Moon et al. | 429/176 |
| 2007/0154785 | A1 * | 7/2007 | Seo et al. | 429/61 |

FOREIGN PATENT DOCUMENTS

| CN | 1783570 A | 6/2006 |
| EP | 1 482 577 A1 | 12/2004 |
| JP | 63-205045 | 8/1988 |
| JP | 2003-007282 | 1/2003 |
| JP | 2003-017016 | 1/2003 |
| JP | 2003-507862 | 2/2003 |
| JP | 2004-303625 | 10/2004 |
| JP | 2004-362874 | 12/2004 |

(Continued)

OTHER PUBLICATIONS

Patent abstracts of Japan for publication No. 2004-303625 dated Oct. 28, 2004 in the name of Tatsuya Kamata.

(Continued)

Primary Examiner — Richard V Muralidar
(74) Attorney, Agent, or Firm — Christie, Parker & Hale, LLP (57) ABSTRACT A battery pack is provided. The battery pack includes: a core pack including a bare cell, and a protective circuit member attached on a side of the bare cell; a housing case for covering at least a portion of the protective circuit member of the core pack, and where a connection part adapted to be connected with an outer electronic appliance is disposed; and a resin-molding part for combining the core pack and the housing case by contacting at least a portion of the core pack and the housing case.

20 Claims, 9 Drawing Sheets

FOREIGN PATENT DOCUMENTS

| | | |
|---|---|---|
| JP | 2006-147328 | 6/2006 |
| JP | 2006-147329 | 6/2006 |
| JP | 2006-156402 | 6/2006 |
| KR | 10-2003-0014351 | 2/2003 |
| KR | 10-2005-0096288 | 10/2005 |
| KR | 10-2005-0123486 | 12/2005 |

OTHER PUBLICATIONS

Patent abstracts of Japan for publication No. 2004-362874 dated Dec. 24, 2004 in the name of Takashi Sumida.

Patent abstracts of Japan for publication No. 63-205045 dated Aug. 24, 1988 in the name of Masatoshi Takasu, et al.

English machine translation of Japanese Publication 2003-017016 listed above.

European Search Report dated Oct. 24, 2007, for corresponding European Patent application 07112550.4, noting European and U.S. references in this IDS, as well as U.S. Publication 2006/127756 previously filed in an IDS dated Apr. 9, 2009.

Japanese Office action dated Apr. 13, 2010, for corresponding Japanese Patent application 2006-282265, noting Japanese references in this IDS.

* cited by examiner

BATTERY PACK AND MANUFACTURING METHOD THEREOF

CROSS-REFERENCE TO RELATED APPLICATION

This application claims priority to and the benefit of Korean Patent Application No. 10-2006-0083667, filed Aug. 31, 2006, in the Korean Intellectual Property Office, the entire content of which is incorporated herein by reference.

BACKGROUND OF THE INVENTION

1. Field of the Invention

The present invention relates to a battery pack and a manufacturing method thereof.

2. Description of the Related Art

Generally, unlike a primary battery, a secondary battery can be charged and discharged, and is formed in a battery-pack. The secondary battery has been widely used as a power source for mobile electronic appliances such as a cell phone, a notebook computer, a personal digital assistant (PDA), a camcorder, etc.

In particular, because of its relatively high operation voltage and energy density per part weight, a lithium secondary battery has been used in the mobile electronic appliances field.

A lithium secondary battery pack generally includes a bare cell having an electrode assembly. The electrode assembly includes a positive electrode plate, a negative electrode plate, and a separator between the positive electrode plate and the negative electrode plate are wound. In addition, the battery pack includes a built-in case that seals the electrode assembly while exposing a positive terminal of the positive electrode plate and a negative terminal of the negative electrode plate. The battery pack is completed by sealing the outer surface of the bare cell with an outer case in a state where a safety device such as a protective circuit is mounted on an outer surface of the bare cell.

A polymer battery pack is another example of a battery pack and includes a core pack formed by connecting a protective circuit member to a pouch-type bare cell, and a case that covers the core pack. Here, the pouch-type bare cell refers to a lithium-polymer battery where an electrode assembly and a polymer electrolyte are contained within a pouch composed of casted polypropylene, aluminum, and/or nylon (and/or polyethyleneterephthalate). For reference purposes, such a polymer battery pack (or lithium-polymer battery) is distinguished from a non-polymer battery pack (or lithium ion battery) that uses liquid electrolyte.

In such a polymer battery pack, a pouch that constitutes a bare cell is mainly an aluminum foil type bare cell, and thus such a pouch is easily damaged by an outer shock, and the reliability of such a cell is relatively low. Accordingly, the polymer battery pack may include an outer case that covers the core pack, in order to protect the core pack, in which a protective circuit member is attached on the pouch-type bare cell, from the outside.

In more detail, a conventional battery pack includes a bare cell that can be charged and discharged; a protective circuit board that is combined electrically to the bare cell, that controls the charge and discharge, and that blocks (or protects) the circuit from being over-charged or over-discharged; and a resin-molding part, which is formed by a hot-melting method in a way that can be mounted to an outside set, and that does not separate the protective circuit board from the bare cell.

The conventional battery pack, where a whole case is formed by a resin-molding part, uses a hot-melting resin in order to form the resin-molding part. However, the outer appearance of the battery pack formed by a hot-melting resin can exhibit relatively high outer appearance defects because of the characteristic of the materials used in the hot-melting resin. For example, bubbles can be generated in the hot-melting resin. In addition, the outer appearance defect rate (or defect rate of the outer form) is even higher at a portion of the outer case of the battery pack formed by the resin-molding part having a relatively complicated shape, e.g. at a portion of the outer case where a protective circuit board is formed.

SUMMARY OF THE INVENTION

Aspects of embodiments of the present invention are directed to a battery pack and a manufacturing method thereof, in which outer appearance defects (or defects of the outer form), which occur when a whole outer case is formed by resin molding, are reduced by forming a housing case through a separate injection molding process, and combining the housing case and a core pack by resin molding on an upper side of the core pack.

According to an embodiment of the present invention, there is provided a battery pack. The battery pack includes: a core pack including a bare cell, and a protective circuit member attached on a side of the bare cell; a housing case for covering at least a portion of the protective circuit member of the core pack, and having a connection part adapted to be connected with an outer electronic appliance; and a resin-molding part for combining the core pack and the housing case by contacting at least a portion of the core pack and the housing case.

In one embodiment, an insulation sheet is disposed between the bare cell and the protective circuit member.

In one embodiment, the bare cell is a pouch-type bare cell including a pouch and an electrode assembly contained in the pouch, the pouch including a front surface where a groove is disposed and a back surface for covering the groove.

In one embodiment, the battery pack further includes: two metal plates each having a main plane and a skirt surface vertically extended from at least two edges of the main plane except for an edge of the main plane corresponding to where the protective circuit member is disposed so that the core pack except for the protective circuit member is covered.

In one embodiment, the resin-molding part is formed at a side part and a base part of the core pack having a plate connection part of the two metal plates attached to the core pack, and at a part where the core pack and the housing case are connected around.

In one embodiment, the housing case includes a channel defined by at least one of two facing long-side walls among four walls of the housing case.

In one embodiment, the channel of the housing case is formed in a size for containing the protective circuit member.

In one embodiment, the housing case includes a supporting part formed at both sides of the channel.

In one embodiment, the supporting part has a stepped portion with an outer surface of the at least one of two facing long-side walls of the housing case and is integrally formed at a position in an inside direction from the outer surface of the at least one of two facing long-side walls.

In one embodiment, the supporting part is formed to have a width defined from an outer surface of a short-side wall of the protective circuit member to an inner part of a side of the bare cell.

In one embodiment, the connection part is formed at the portion corresponding to a vertical direction with the supporting part.

In one embodiment, the housing case includes a polycarbonate material and/or a poly-butylene-terephthalate material.

In one embodiment, the resin-molding part is made of a poly-amide-system hot-melting resin.

According to another embodiment of the present invention, there is provided a method of manufacturing a battery pack. The method includes: attaching a protective circuit member on a part of a bare cell to form a core pack; forming a housing case including a channel for containing the protective circuit member positioned on the part of the bare cell and a connection part for connecting with an outer electronic appliance; covering the protective circuit member of the core pack with the housing case; and forming a resin-molding part to cover at least a portion of the core pack and the housing case.

In one embodiment, the forming the housing case includes integrally forming an outer terminal exposed to a surface of the housing case so that the outer terminal is connected with the outer electronic appliance, the channel for containing the protective circuit member and defined by at least one of two facing long-side walls among four walls of the housing case, a supporting part made in both sides of the channel to have a width defined from an outer surface of a short-side wall of the protective circuit member to an inner part of the side of the bare cell, and the connection part positioned at a position corresponding to the support part in a vertical direction.

In one embodiment, the supporting part has a stepped portion with an outer surface of the at least one of two facing long-side walls of the housing case and is integrally formed at a position in an inside direction from the outer surface of the at least one of two facing long-side walls.

In one embodiment, the covering the protective circuit member includes: inserting the supporting part into an outer side portion of two facing short-side walls of the protective circuit member; and welding the protective circuit member and the outer terminal using a space in the channel.

In one embodiment, the method further includes: attaching two metal plates, each being formed with a main plane and a skirt surface vertically extended from at least two edges of the main surface except for an edge corresponding to where the protective circuit member is formed after covering the protective circuit member of the core pack with the housing case, to cover the core pack except for the protective circuit member.

In one embodiment, the forming of the resin-molding part to cover the portion of the core pack and the housing case comprises molding with a hot-melting resin at a side part and a base part of the core pack having a plate connection part of the two metal plates attached to the core pack, and at a part where the core pack and the housing case are connected around.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. In addition, when an element is referred to as being "on" another element, it can be directly on the another element or be indirectly on the another element with one or more intervening elements interposed therebetween. Like reference numerals designate like elements throughout the specification.

Figure 1:
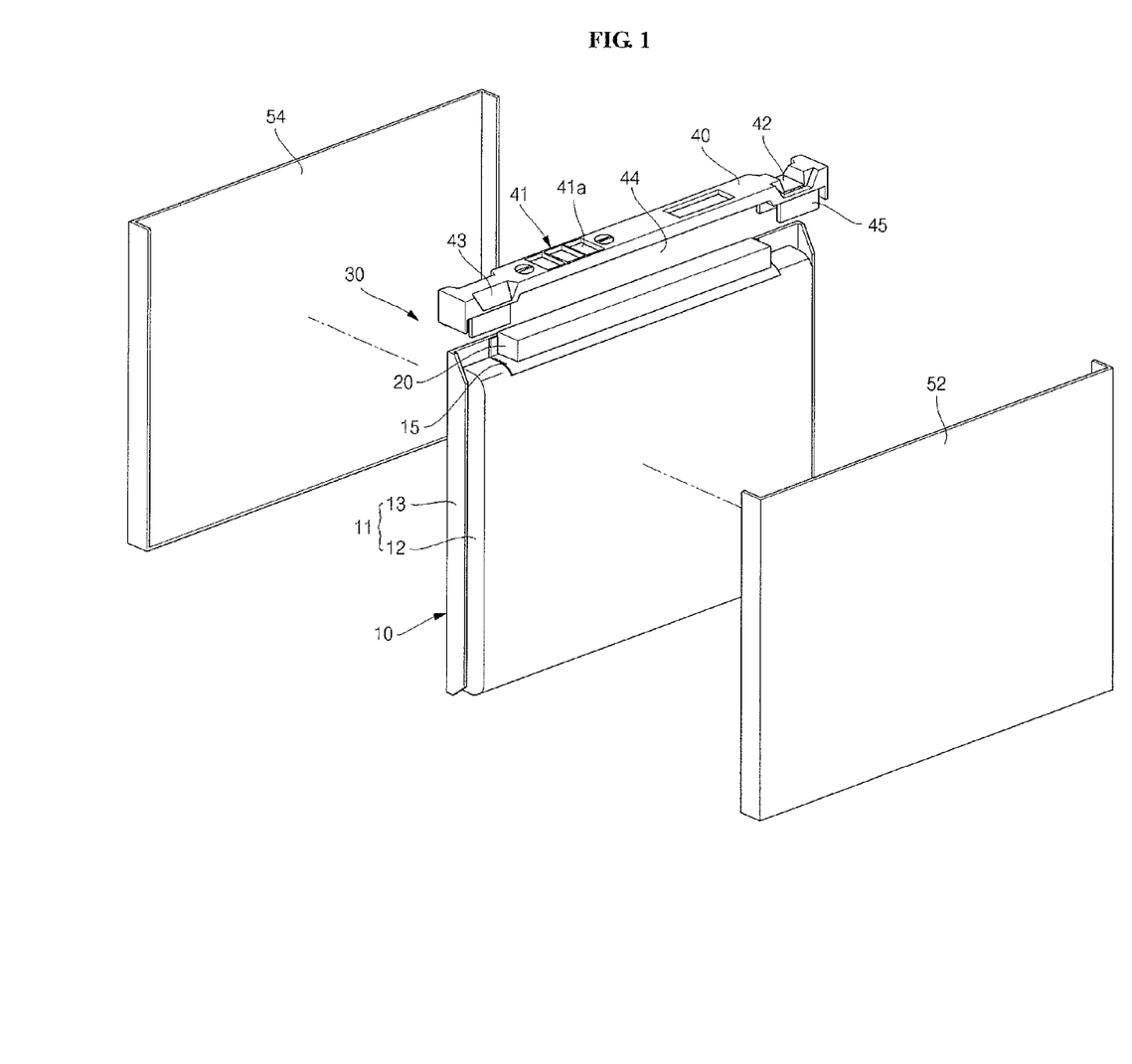
FIG. 1 an exploded perspective schematic view illustrating a state before a resin-molding part is formed in a battery pack according to an embodiment of the present invention.
Figure 2:
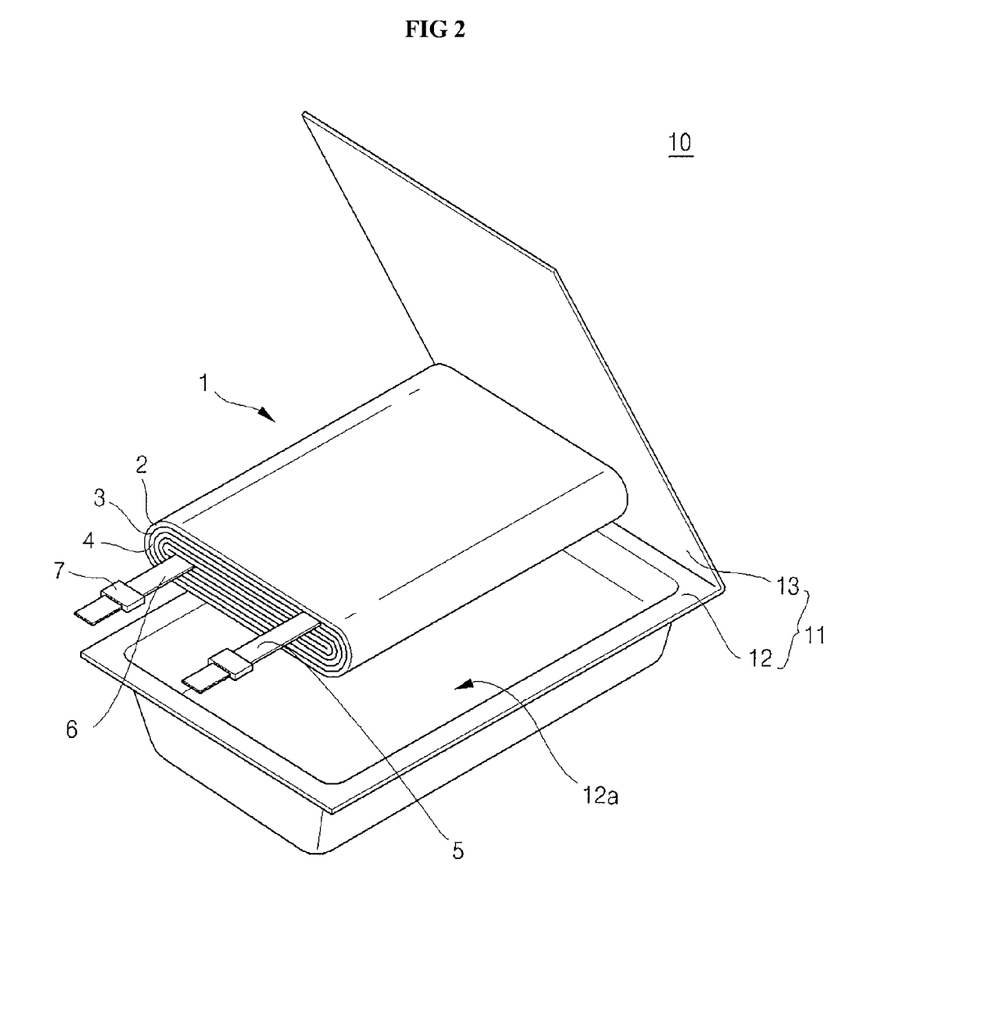
FIG. 2 is a perspective schematic view illustrating a state before a pouch is sealed in a pouch bare cell of the battery pack according to an embodiment of the present invention.
Figure 3:
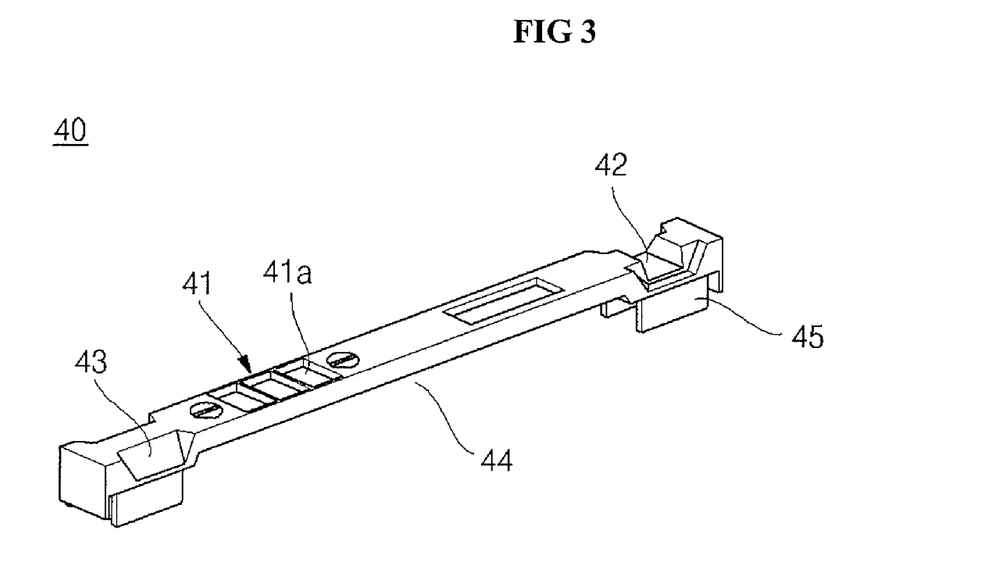
FIG. 3 is an enlarged perspective schematic view of a housing case in FIG. 1.
Figure 4:
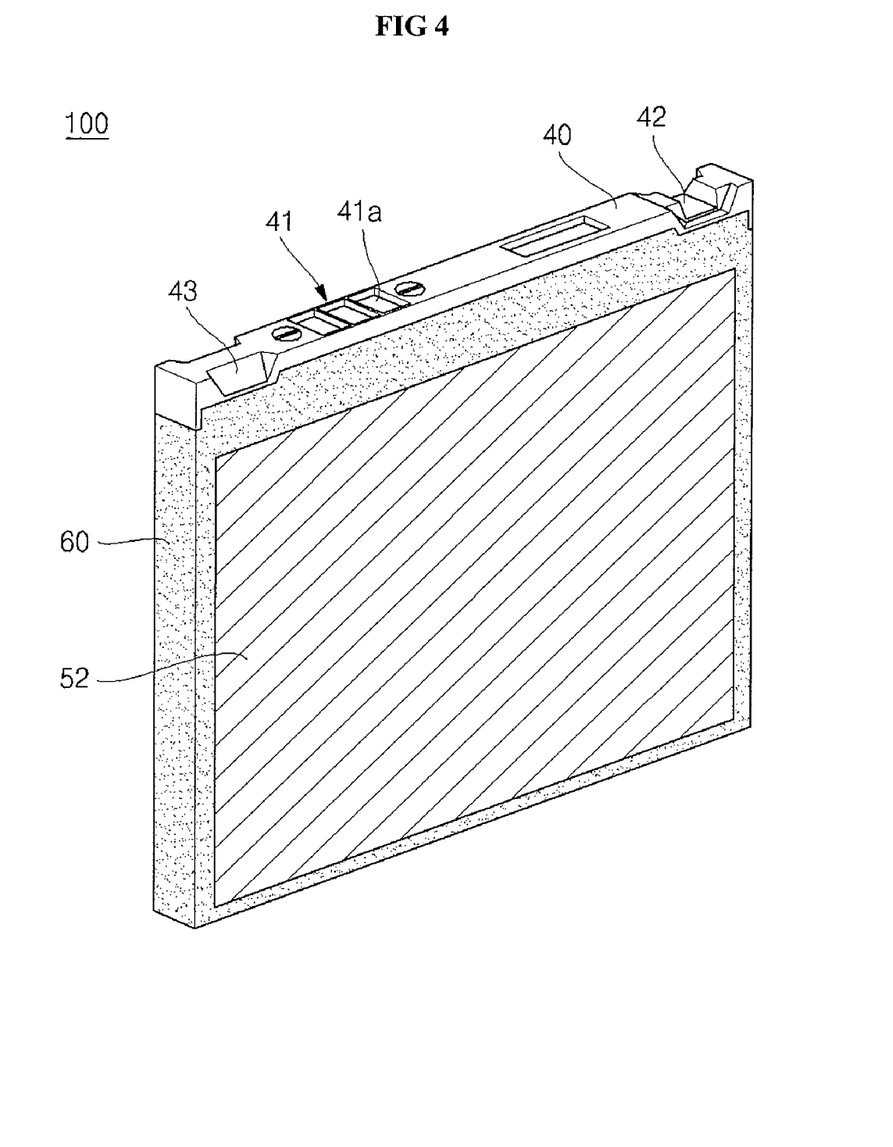
FIG. 4 is a perspective schematic view illustrating a battery pack having a resin-molding part according to an embodiment of the present invention.

FIG. 1 illustrates a state before a resin-molding part is formed in a battery pack according to an embodiment of the present invention, FIG. 2 illustrates a state before a pouch is sealed in a pouch bare cell of the battery pack according to an embodiment of the present invention, FIG. 3 an enlarged view of a housing case in FIG. 1, and FIG. 4 illustrates a battery pack having a resin-molding part according to an embodiment of the present invention.

Referring to FIGS. 1 to 4, a battery pack 100 according to an embodiment of the present invention includes a core pack 30 that includes a bare cell, and a protective circuit member 20 attached on an upper side (or a first side) of a pouch-type bare cell 10; a housing case 40 that covers at least a portion of the protective circuit member 20 of the core pack 30, and includes an outer terminal 41, a connection part having locker(s) 42 and hook(s) 43 to be connected with an outer electronic appliance; and a resin-molding part 60 that combines the core pack 30 and the housing case 40 by contacting at least a portion of the core pack 30 and the housing case 40.

A bare cell that constitutes a core pack is described below in more detail. In the present embodiment, a bare cell can be a square-shaped battery or a pouch-type battery. Here, an example of a pouch-type battery is used for exemplary purposes.

Referring to FIGS. 1 and 2, in the pouch-type bare cell 10, a pouch 11 is formed as an outer shell.

Such a pouch 11, as shown in FIG. 1, includes two long-side parts having a relatively wide area facing each other, and four short-side parts having a relatively narrow area along the edges of the long-side parts. Here, three of the four short-side parts are mutually thermal-adhered, and the remaining short-side part (e.g., formed in left and right directions along a height direction with reference to FIG. 1) is folded at an angle (that may be predetermined) so that the width of the pouch-type bare cell 10 is minimized. An electrode assembly is disposed in the inside of the long-side parts and the short-side parts of the pouch 11.

As shown in FIG. 2, an electrode assembly 1 is formed in a jelly roll structure by winding a multiple of layers stacked in the order of a positive electrode plate 2, a separator 3, and a negative electrode plate 4. When winding the jelly roll structure, in order to prevent (or protect from) a short circuit of the positive electrode plate 2 and the negative electrode plate 4, the separator 3 is attached on the outer electrode side or the inner electrode side of the roll.

The formed jelly roll structure (or jelly roll) is disposed on a groove 12a on the front surface 12 of the pouch 11. Further, after covering the front surface 12 of the pouch with the back surface 13 of the pouch 11, in the state where the edge part of the groove 12a is closely adhered, the pouch 11 is sealed by heating and giving pressure, and the short side of the pouch 11 is folded to form a pouch-type bare cell 10.

Here, the end part of electrode tabs 5 and 6 drawn out of the electrode plates 2 and 4 of the electrode assembly 1 is exposed to the outside of the sealed pouch 11. Herein, an insulation tape 7 is further included in order to prevent (or protect from) an electrical short between the electrode tabs 5 and 6, and the pouch 11.

The exposed electrode tabs 5 and 6 are electrically connected with the protective circuit member 20, installed for the safety of the battery, shown in FIG. 1. In other words, the protective circuit member 20 is mounted on the upper side of the pouch-type bare cell 10, i.e., the upper side between short-side parts formed at the left and right sides, and thus the pouch-type bare cell 10 and the protective circuit member 20 are electrically connected, thereby forming the core pack 30.

A protective circuit such as a suitable circuit that evens the charging state by controlling the charge and the discharge of the battery, or a suitable circuit that prevents (or protects from) the over-charge and the over-discharge, is formed at a printed circuit board of the protective circuit member 20 that constitutes the core pack 30. Further, protective elements such as a thermistor or a thermal fuse can be mounted on the protective circuit member 20, and in the case when the voltage or the current of the battery exceeds the allowed point resulting in a relatively high temperature, the over-charge or the over-discharge protection elements block a current flow, thus preventing possible battery explosion, fire, etc.

Further, an insulation sheet 15 can be formed on the upper side of the pouch-type bare cell 10 in order to prevent (or protect from) a short circuit due to an unnecessary connection of the protective circuit member 20 and the pouch-type bare cell 10.

In order to cover at least a portion of the protective circuit member 20 of the core pack 30, the battery pack 100 includes the housing case 40 that covers the protective circuit member 20.

As illustrated in FIG. 3, the housing case 40 includes an opening at a lower (or base) part in order to cover the protective circuit member 20, and includes side wall(s) extended to the lower part from edge(s) of an upper surface of the housing case 40. Further, the housing case 40 includes the outer terminal 41 and the connection part having the locker(s) 42 and the hook(s) 43 at the upper surface, and includes a groove 44 and supporting part(s) 45 at the side wall(s).

The outer terminal 41 is used to electrically connect an outer electronic appliance with the protective circuit member 20, and is formed so that metal part(s) 41a having conductivity are exposed to the upper surface of the housing case 40.

The locker(s) 42 and the hook(s) 43 are used to physically connect an outer electronic appliance device with the completed battery pack, and have a form corresponding to the joint part(s) of the outer electronic appliance.

The groove (or channel) 44 is formed in (or defined by) at least one of two long-side walls among the four side walls of the housing case 40. In the present invention, by forming the groove 44 at the two long-side walls, after inserting the housing case 40 into the upper part of the core pack 30, the protective circuit member 20 of the core pack 30 and the outer terminal 41 of the housing case 40 are easily welded through the space formed by the groove 44. Such a groove 44 can be formed in a size that can contain the protective circuit member 20 so that the protective circuit member 20 is suitable and/or easily covered.

Further, the supporting part 45 is formed at the both sides of the groove 44. More specifically, the supporting part 45 has a stepped portion with an outer surface of the at least one of two facing long-side walls of the housing case 40 and is integrally formed at a position in an inside direction from the outer surface of the at least one of two facing long-side walls. The supporting part 45 is formed so as to secure the space where the resin is filled so that the housing case 40 and the core pack 30 have a flat outer surface after molding when molded with the resin for the combination of the housing case 40 and the core pack 30. Also, a stepped side is formed in between the short-side wall of the housing case 40 and the short-side wall of the core pack 30 when the housing case 40 covers the protective circuit member 20 of the core pack 30 by forming the long side of the housing case 40 to be longer than the long side of the core pack 30. Hence, the short-side wall of the housing case 40 and the short-side wall of the core pack 30 are configured to have a flat outer surface when the stepped part of the short-side wall of the housing case 40 and the short-side wall of the core pack 30 define a space where the resin is filled, and is molded with the resin. Such a supporting part 45 is formed to have a width defined from the outer surface of a short-side wall of the protective circuit member 20 to the inner part of the side of the pouch-type bare cell 10, thus preventing (or blocking) a movement of the protective circuit member 20 when the housing case 40 is combined to the core pack 30. The locker 42 and the hook 43 are positioned at the part corresponding to the supporting part 45 in the vertical direction, and buffer the impact generated when the locker 42 and the hook 43 of the housing case 40 are combined with the connection part of the outer electronic appliance in the supporting part 45.

Complicated shapes such as the outer terminal 41, the locker 42, the hook 43, the groove 44, and the supporting part 45 are integrally formed by injection molding in the housing case 40.

Accordingly, since the protective circuit member 20 connected to the pouch-type bare cell 10 is covered by a separate housing case 40, the outer appearance defect rate (or the defect rate of the outer form) generated in a complicated shape part of the case can be reduced.

Since such a housing case 40 covers the protective circuit member 20 that controls the charge and the discharge of the pouch-type bare cell 10, that senses the temperature of the pouch type bare cell 10 when the temperature exceeds a certain point so as to prevent (or protect from) a short circuit, a strong resin having a relatively high resistance against external impacts should be used to make the housing case 40 in order to protect the protective circuit member 20 from the external impacts. Accordingly, the housing case 40 is made of a mechanically strong resin having resistance against the external impacts, e.g., a poly-carbonate-system resin and/or a poly-butylene-terephthalate-system resin.

The battery pack according to an embodiment of the present invention includes metal plates 52, 54 that cover the core pack 30 part except for the protective circuit member 20. Each of the metal plates 52, 54 is formed with a main plane and a skirt surface vertically extended from at least two edges of the main plane (e.g., the skirt surfaces are formed on all edges of the main plane except for edge(s) to the direction (or corresponding to) where the protective circuit member 20 is formed). In one embodiment, such metal plates 52, 54 are made of stainless steel, thus providing a relatively high outer strength and protecting the battery pack 100 from the outside.

In order to combine the core pack 30 where the metal plates 52, 54 are attached, with the housing case 40, the battery pack 100 according to an embodiment of the present invention includes a resin-molding part 60.

As illustrated in FIG. 4, the resin-molding part 60 combines the core pack 30 and the housing case 40 by contacting at least a portion of the core pack 30 and the housing case 40. Specifically, the resin-molding part 60 is formed by molding the connection part of the metal plates 52, 54 that cover the core pack 30, i.e., the side part and the lower (or base) part of the core pack 30, and the connection part of the housing case 40, i.e., the part where the core pack 30 and the housing case 40 are to be connected around, with a hot-melting resin. In one embodiment of the present invention, the hot-melting resin is not used in forming the outer form (or appearance) of a complicated shape of the protective circuit member in the battery pack, but is used only to combine the housing case 40 and the core pack 30, and thus the defect of the outer form can be prevented when the outer form of the complicated shape is formed. Herein, the resin-molding part 60 combines the housing case 40 and the core pack 30, and thus it is made of a highly-adhesive poly-amide-system resin.

Hereinafter, the process of manufacturing a battery pack according to an embodiment will be described in more detail below.

Figure 5:
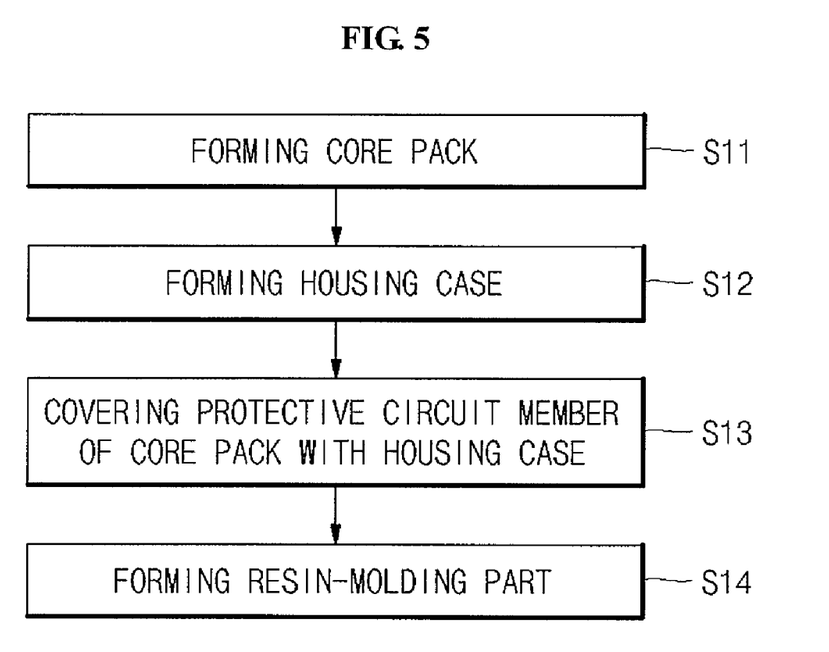
FIG. 5 is a flowchart illustrating a method of manufacturing a battery pack according to an embodiment of the present invention.
Figure 6:
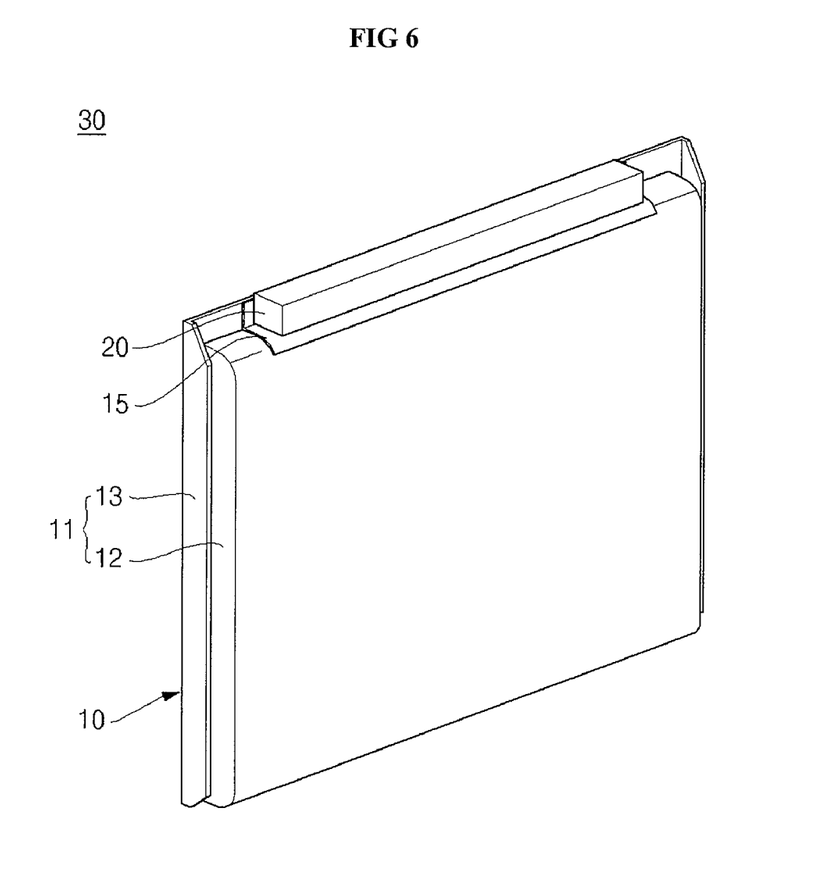
FIG. 6 is a perspective schematic view illustrating a process of forming a core pack in a method of manufacturing a battery pack according to an embodiment of the present invention.
Figure 7:
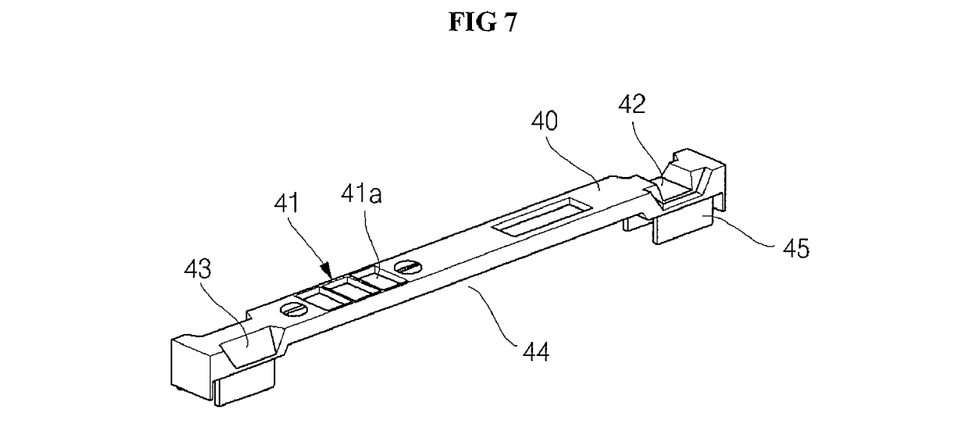
FIG. 7 is a perspective schematic view illustrating a process of forming a housing case in a method of manufacturing a battery pack according to an embodiment of the present invention.
Figure 8:
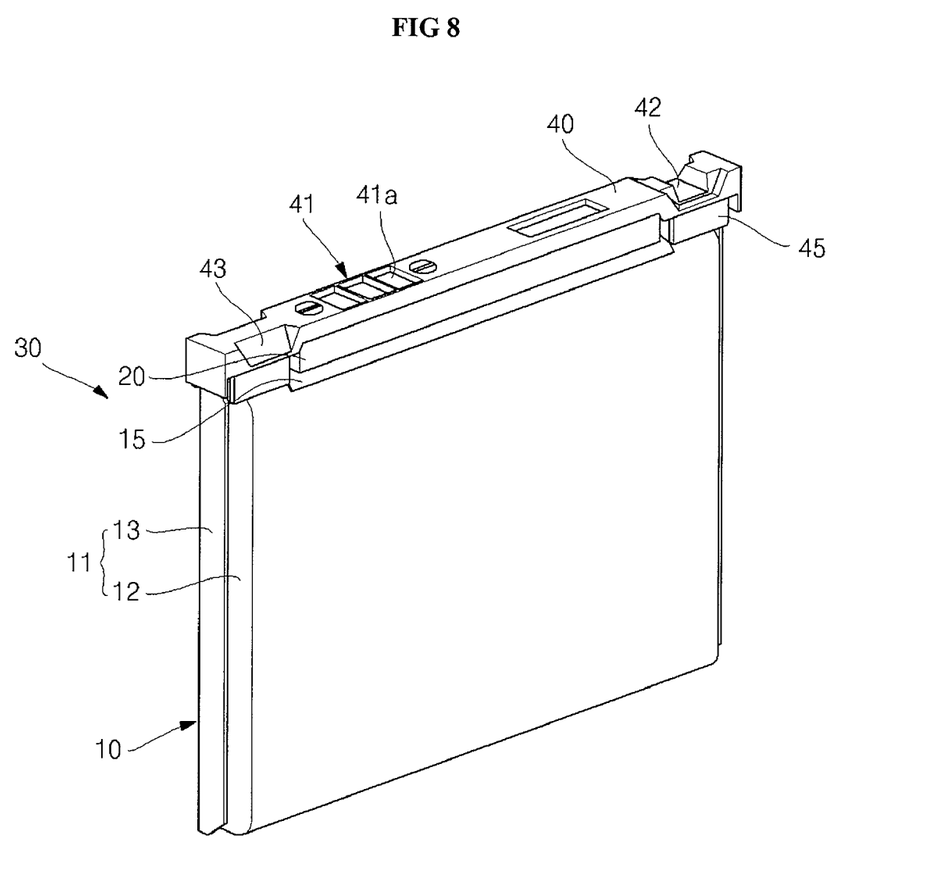
FIG. 8 is a perspective schematic view illustrating a process of covering the protective circuit member of the core pack in FIG. 6 with the housing case in FIG. 7 in a method of manufacturing a battery pack according to an embodiment of the present invention.
Figure 9:
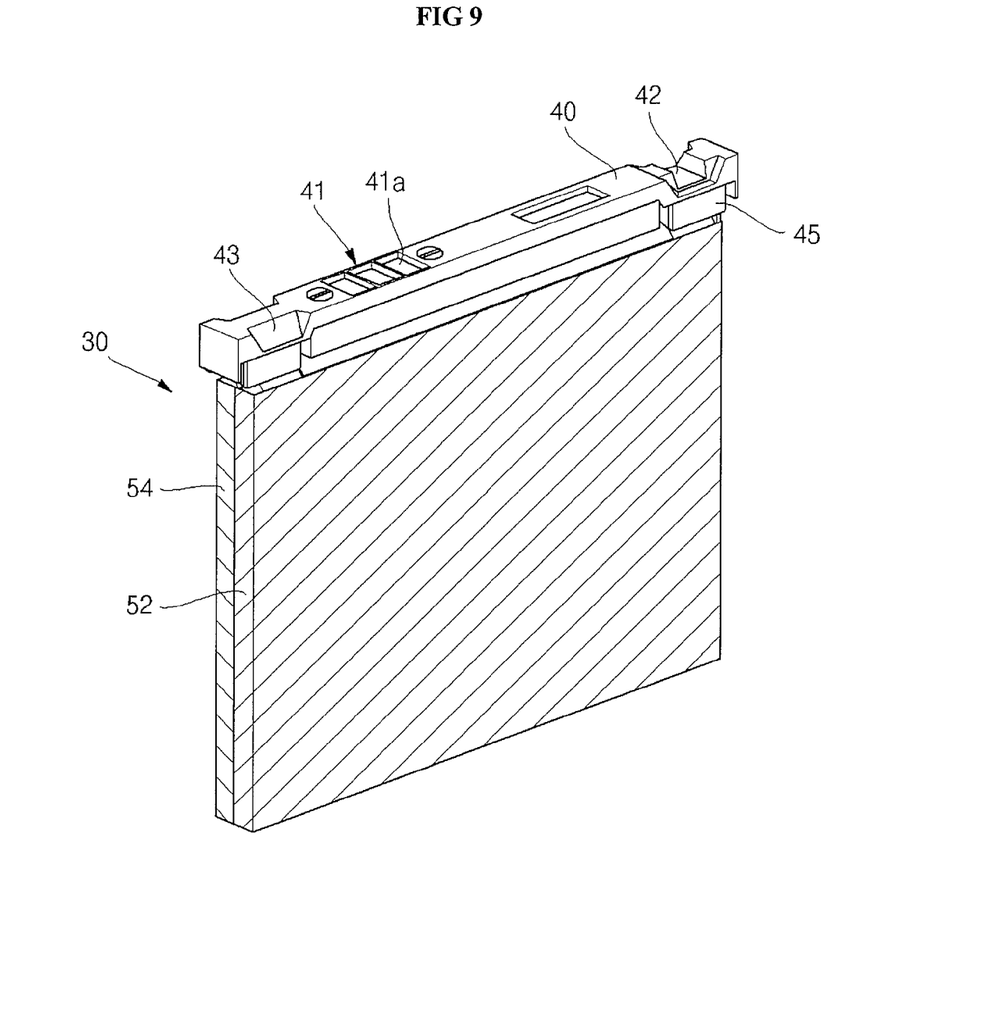
FIG. 9 is a perspective schematic view illustrating the attachment of a metal plate on a core pack to cover the core pack except for a protective circuit member in FIG. 8 according to an embodiment of the present invention.
Figure 10:
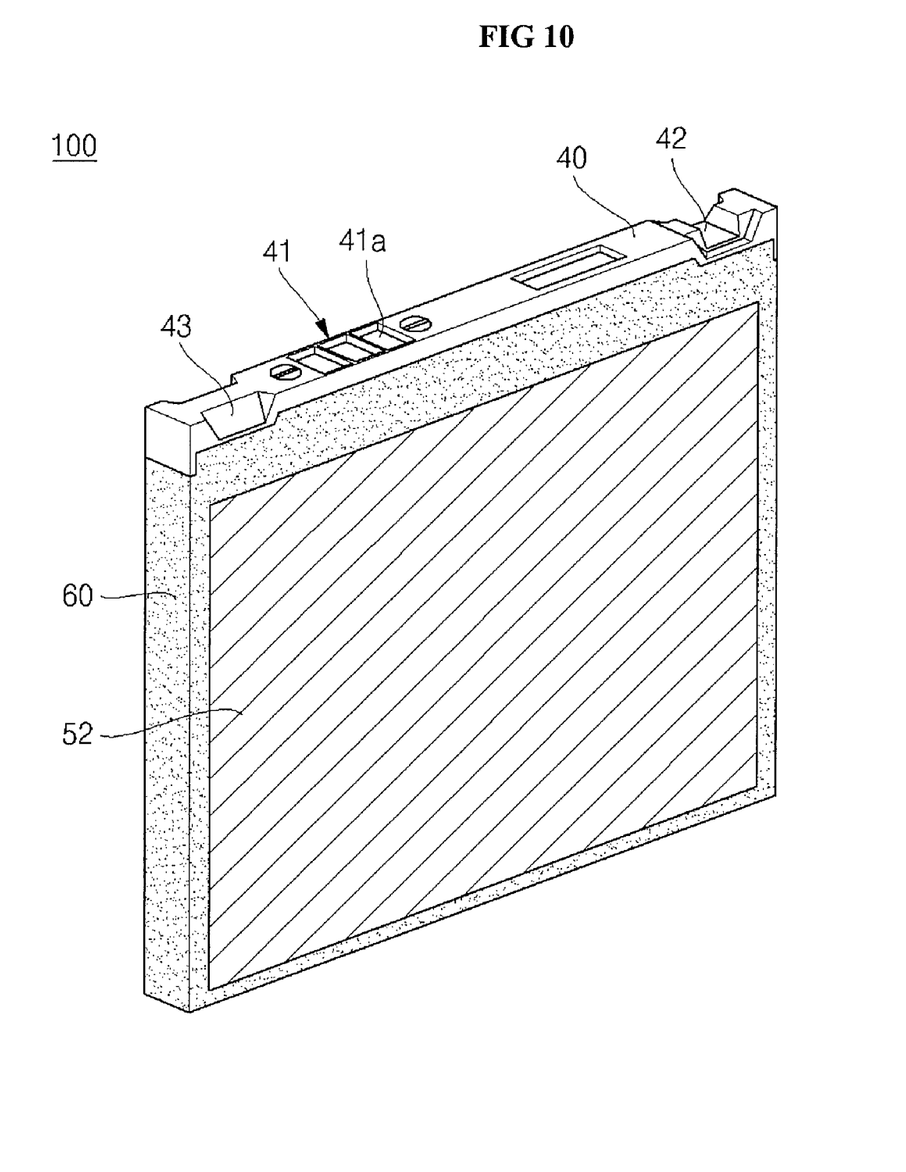
FIG. 10 is a perspective schematic view illustrating a formation of a resin-molding part in a portion of the core pack and the housing case in FIG. 9.

FIG. 5 illustrates a method of manufacturing a battery pack according to an embodiment of the present invention. FIG. 6 illustrates forming a core pack in a method of manufacturing a battery pack according to an embodiment of the present invention. FIG. 7 illustrates forming a housing case in a method of manufacturing a battery pack according to an embodiment of the present invention. FIG. 8 illustrates covering the protective circuit member of the core pack in FIG. 6 with the housing case in FIG. 7 in a method of manufacturing a battery pack according to an embodiment of the present invention. FIG. 9 illustrates the attachment of a metal plate on a core pack to cover to the core pack except for a protective circuit member in FIG. 8 according to an embodiment of the present invention. FIG. 10 illustrates the formation of a resin-molding part in a portion of the core pack and the housing case in FIG. 9.

First, in the process of forming a core pack S11, a pouch-type bare cell, an example of a bare cell constituting a core pack, is used for explanation. Referring to FIG. 6, a jelly-roll, formed by winding multiple layers stacked in the order of a positive electrode plate, a separator, and a negative electrode plate in a jelly-roll structure, is disposed in a groove formed in a front surface 12 of a pouch, the front surface 12 of the pouch is covered by a back surface 13 of the pouch, left and right edges of the groove are folded, and the edges around the groove are sealed to thereby form a pouch-type bare cell 10. A core pack 30 is formed by electrically connecting an electrode tab of the electrode roll exposed to the upper side of the pouch-type bare cell 10 to a protective circuit member 20. Herein, an insulation sheet 15 can be further formed on the upper side of the pouch-type bare cell 10 in order to prevent (or protect from) an unnecessary short circuit between the pouch-type bare cell 10 and the protective circuit member 20.

Further, in the process of forming the housing case S12, as illustrated in FIG. 7, the housing case 40 is formed by integrally forming an outer terminal 41 exposed to the upper side (or surface) so as to be connected to the external electronic devices, a groove (or channel) 44 formed in a size that can contain the protective circuit member 20 in (or defined by) at least one of two mutually-facing long-side walls of four side walls and the upper side (or surface) of the hosing case 40 except at the upper side (or surface) where the outer-terminal 41 is exposed, a supporting part 45 formed with a width defined from the outer surface of the short-side wall of the protective circuit member 20 to the inner surface of the side of the pouch-type bare cell 10 in both sides of the groove 44 formed at the long-side wall, and a connection part, e.g., a locker 42 and/or a hook 43 formed at the part corresponding to the vertical direction with the supporting part 45. Herein, the supporting part 45 has a stepped portion with an outer surface of the at least one of two facing long-side walls of the housing case 40 and is integrally formed at a position in an inside direction from the outer surface of the at least one of two facing long-side walls. Accordingly, in the process of forming a resin-molding part S14, when molding the housing case 40 and the core pack 30 with a resin, the space where the resin is filled up is secured after the molding so that the housing case 40 and the core pack 30 have a flat outer surface. Likewise, by forming the long-side part of the housing case 40 to be longer than the long-side part of the core pack 30, when the housing case 40 covers the protective circuit member 20, a stepped portion is formed between the short-side wall of the housing case 40 and the short-side wall of the core pack 30. Hence, the short-side wall of the housing case 40 and the short-side wall of the core pack 30 are formed to have a flat outer surface when the stepped portion of the short-side wall of the housing case 40 and the short-side wall of the core pack 30 define a space where the resin is filled, and is molded with the resin.

Then, in the process of covering the protective circuit member of the core pack with a housing case S13, as illustrated in FIG. 8, the supporting part 45 of the housing case 40 formed in the process of forming a housing case S12 is inserted into the outer side portion of two facing short-side walls of the protective circuit member 20. Then, the protective circuit member 20 and the outer terminal 41 are welded using the space formed in the groove 44 in order to electrically connect the protective circuit member 20 to the outer terminal 41 formed at the housing case 40. Then, as illustrated in FIG. 9, two metal plates 52, 54 are attached at the core pack 30 to cover the core pack 30, which have main planes and skirt surfaces vertically extended from at least two edges of the main planes except for edges in (or to) the direction (or corresponding to) where the protective circuit member 20 is formed, thus securing the strength of the battery pack.

Finally, in the process of forming a resin-molding part S14, as illustrated in FIG. 10, a resin-molding part 60 is formed by covering at least a portion of the core pack 30 and the housing case 40. Specifically, the resin-molding part 60 is formed by molding the side part and the lower (or base) part of the core pack 30 having the connection part (or plate connection part) of the two metal plates 52, 54 attached on the core pack 30, and the portion where the core pack 30 and the housing case 40 are to be connected around, with a hot-melting resin. Herein, the hot-melting resin combines the core pack 30 and the housing case 40, and firmly fixes the protective circuit member 20 positioned at the inner side by filling in the inner side of the housing case 40 through the groove 44 of the housing case 40.

In view of the foregoing, a battery pack and a manufacturing method thereof according to embodiments of the present invention are provided to prevent (or protect) a protective circuit member from being pushed or pressed to a bare-cell side, and defects of the outer form (or outer appearance defects), which can occur when the whole outer case is formed by the hot-melting-resin molding, are reduced by forming a housing case through a separate injection molding process in advance of using a mechanically-strong resin, and combining the housing case and a core pack by resin molding a upper side of the core pack.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   a core pack comprising a bare cell, and a protective circuit member attached on a side of the bare cell;
   a housing case for covering at least a portion of the protective circuit member of the core pack, and having a connection part adapted to be connected with an outer electronic appliance; and
   a resin-molding part for combining the core pack and the housing case by contacting at least a portion of the core pack and the housing case, wherein the housing case comprises a supporting part at each side of the housing case, the protective circuit member is between the bare cell and a side of the housing case closest to the bare cell, and each supporting part has opposite sides facing away from each other and the protective circuit member that are completely embedded in the resin molding part.

2. The battery pack claimed in claim 1, wherein an insulation sheet is disposed between the bare cell and the protective circuit member.

3. The battery pack claimed in claim 1, wherein the bare cell is a pouch-type bare cell comprising a pouch and an electrode assembly contained in the pouch, the pouch comprising a front surface where a groove is disposed and a back surface for covering the groove.

4. The battery pack claimed in claim 1, wherein the housing case comprises a channel defined by at least one of two facing long-side walls among four walls of the housing case.

5. The battery pack claimed in claim 4, wherein the channel of the housing case is formed in a size for containing the protective circuit member.

6. The battery pack claimed in claim 4, wherein the supporting part has a stepped portion with an outer surface of the at least one of two facing long-side walls of the housing case and is integrally formed at a position in an inside direction from the outer surface of the at least one of two facing long-side walls.

7. The battery pack claimed in claim 1, wherein the housing case comprises a poly-carbonate material and/or a poly-butylene-terephthalate material.

8. The battery pack claimed in claim 1, wherein the resin-molding part is made of a poly-amide-system hot-melting resin.

9. A battery pack comprising:
   a core pack comprising a bare cell, and a protective circuit member attached on a side of the bare cell;
   a housing case for covering at least a portion of the protective circuit member of the core pack, and having a connection part adapted to be connected with an outer electronic appliance; and
   a resin-molding part for combining the core pack and the housing case by contacting at least a portion of the core pack and the housing case, wherein the housing case comprises a supporting part at both sides of the housing case and the supporting part is embedded in the resin molding part and is formed to have a width defined from an outer surface of a short-side wall of the protective circuit member to an inner part of a side of the bare cell.

10. The battery pack claimed in claim 9, wherein the connection part is formed at the portion corresponding to a vertical direction with the supporting part.

11. A method of manufacturing a battery pack, the method comprising:
    attaching a protective circuit member on a part of a bare cell to form a core pack;
    forming a housing case for containing the protective circuit member positioned on the part of the bare cell and a connection part for connecting with an outer electronic appliance;
    covering the protective circuit member of the core pack with the housing case; and
    forming a resin-molding part to cover at least a portion of the core pack and the housing case, wherein the forming of the housing case comprises integrally forming a supporting part at each side of the housing case, each supporting part having opposite sides facing away from each other and the protective circuit member that are completely embedded in the resin molding part, and the protective circuit member being between the bare cell and a side of the housing case closest to the bare cell.

12. A method of manufacturing a battery pack, the method comprising:
    attaching a protective circuit member on a part of a bare cell to form a core pack;
    forming a housing case comprising a channel for containing the protective circuit member positioned on the part of the bare cell and a connection part for connecting with an outer electronic appliance and integrally forming an outer terminal exposed to a surface of the housing case so that the outer terminal is connected with the outer electronic appliance, the channel for containing the protective circuit member and defined by at least one of two facing long-side walls among four walls of the housing case, a supporting part being formed in both sides of the channel to have a width defined from an outer surface of a short-side wall of the protective circuit member to an inner part of the side of the bare cell, and the connection part being positioned at a position corresponding to the supporting part in a vertical direction;
    covering the protective circuit member of the core pack with the housing case; and
    forming a resin-molding part to cover at least a portion of the core pack and the housing case.

13. The method claimed in claim 12, wherein the supporting part has a stepped portion with an outer surface of the at least one of two facing long-side walls of the housing case and is integrally formed at a position in an inside direction from the outer surface of the at least one of two facing long-side walls.

14. The method claimed in claim 13, wherein the covering the protective circuit member comprises:
   inserting the supporting part into an outer side portion of two facing short-side walls of the protective circuit member; and
   welding the protective circuit member and the outer terminal using a space in the channel.

15. The method claimed in claim 14, further comprising:
   attaching two metal plates, each being formed with a main plane and a skirt surface vertically extended from at least two edges of the main plane except for an edge corresponding to where the protective circuit member is formed after covering the protective circuit member of the core pack with the housing case, to cover the core pack except for the protective circuit member.

16. The method claimed in claim 15, wherein the forming of the resin-molding part to cover the portion of the core pack and the housing case comprises molding with a hot-melting resin at a side part and a base part of the core pack having a plate connection part of the two metal plates attached to the core pack, and at a part where the core pack and the housing case are connected around.

17. A battery pack comprising:
   a core pack comprising a bare cell, and a protective circuit member attached on a side of the bare cell;
   a housing case for covering at least a portion of the protective circuit member of the core pack, and having a connection part comprising a first engagement surface and a second engagement surface, the engagement surfaces being adapted to be physically connected with an outer electronic appliance and being on a same side of the housing case opposite the protective circuit member;
   two metal plates each having a main plane and configured to cover at least two largest surfaces of the core pack; and
   a resin-molding part for combining the core pack and the housing case by contacting at least a portion of the core pack and the housing case, and having a completely bounded window configured to substantially expose the main planes of the two metal plates.

18. The battery pack claimed in claim 17, wherein the two metal plates each having a skirt surface vertically extended from at least two edges of the main plane except for an edge of the main plane corresponding to where the protective circuit member is disposed so that the core pack except for the protective circuit member is covered.

19. The battery pack claimed in claim 18, wherein the resin-molding part is further formed at a side part and a base part of the core pack, and at a part where the core pack and the housing case are connected around.

20. The battery pack of claim 17, wherein the connection part further comprises an electrical connection part that is between the engagement surfaces and that is adapted to be electrically connected with the outer electronic appliance.

* * * * *